United States Patent [19]

Melchior et al.

[11] 4,430,860
[45] Feb. 14, 1984

[54] SUPERCHARGED INTERNAL COMBUSTION ENGINES, INTER ALIA DIESEL ENGINES

[75] Inventors: Jean F. Melchior, Neuilly-sur-Seine; Thierry Andre, Paris, both of France

[73] Assignee: The French State, Paris, France

[21] Appl. No.: 481,269

[22] Filed: Apr. 4, 1983

Related U.S. Application Data

[63] Continuation of Ser. No. 216,367, Dec. 15, 1980, abandoned.

[30] Foreign Application Priority Data

Dec. 19, 1979 [FR] France .............................. 79 31038

[51] Int. Cl.³ .............................................. F02B 33/44
[52] U.S. Cl. .............................................. 60/606
[58] Field of Search .............................................. 60/606

[56] References Cited

U.S. PATENT DOCUMENTS

2,655,787 10/1953 Brown .............................. 60/39.23
4,004,414 1/1977 Melchior .............................. 60/606
4,026,115 5/1977 Melchior et al. .

FOREIGN PATENT DOCUMENTS

2253389 12/1973 France .

*Primary Examiner*—Douglas Hart
*Attorney, Agent, or Firm*—Barnes, Kisselle, Raisch, Choate, Whittemore & Hulbert

[57] ABSTRACT

In a supercharged engine, a bypass connected to the compressor delivery pipe (4) supplies the turbine with all the air which has not been absorbed by the engine. The bypass (4) is divided into a first branch which supplies combustive air to the primary region (10) of an auxiliary combustion chamber and a second branch which supplies diluting air to the secondary region of the aforementioned chamber and comprises first throttle means. The first branch has second throttle means (13) comprising coupled orifices (14, 15) formed respectively on an inner sleeve (16) and an outer sleeve (17) movable relative to one another. According to the invention, a radial clearance (a) is maintained between the sleeves (16, 17) irrespective of their respective temperatures. Third throttle means (45), having a zero minimum flow section, are provided upstream or level with the second means (13).

15 Claims, 12 Drawing Figures

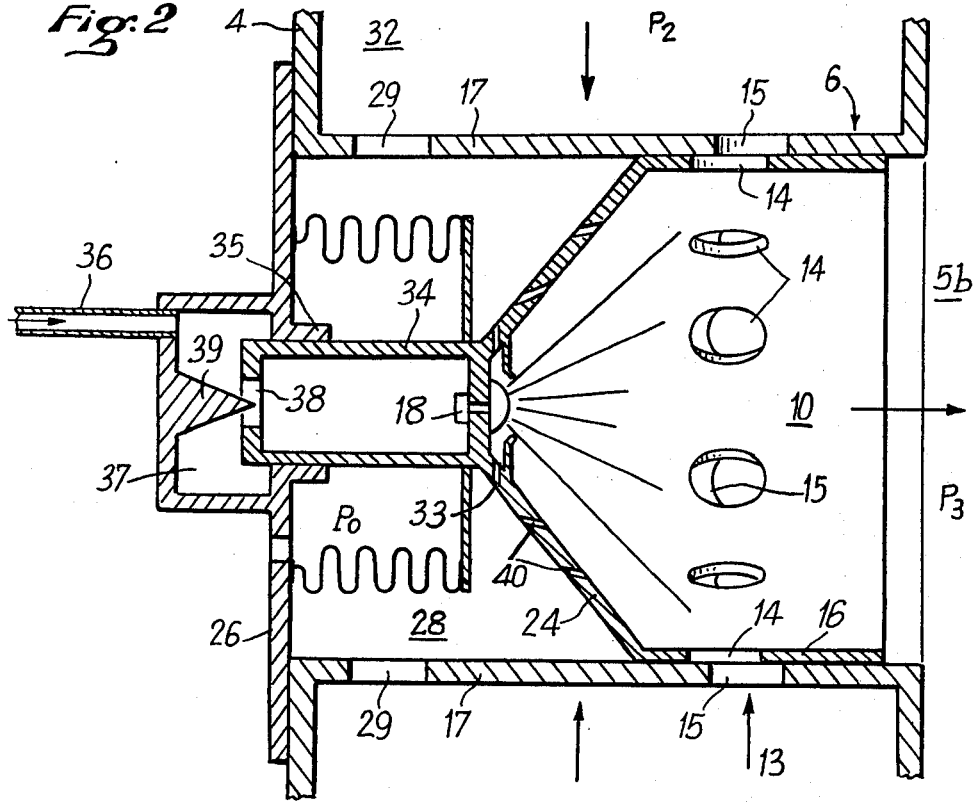
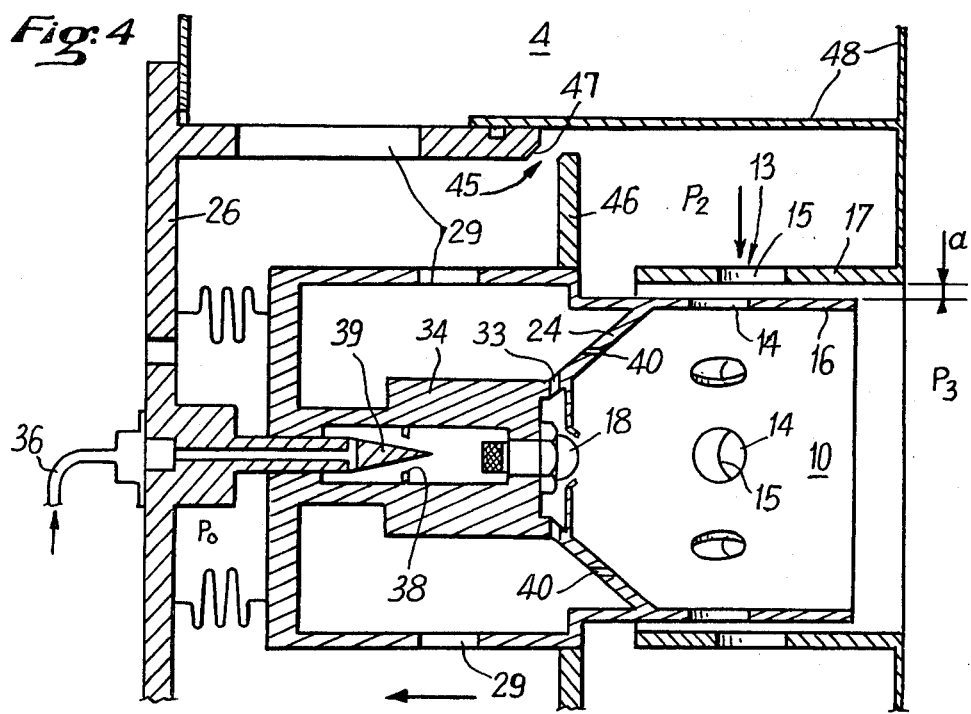

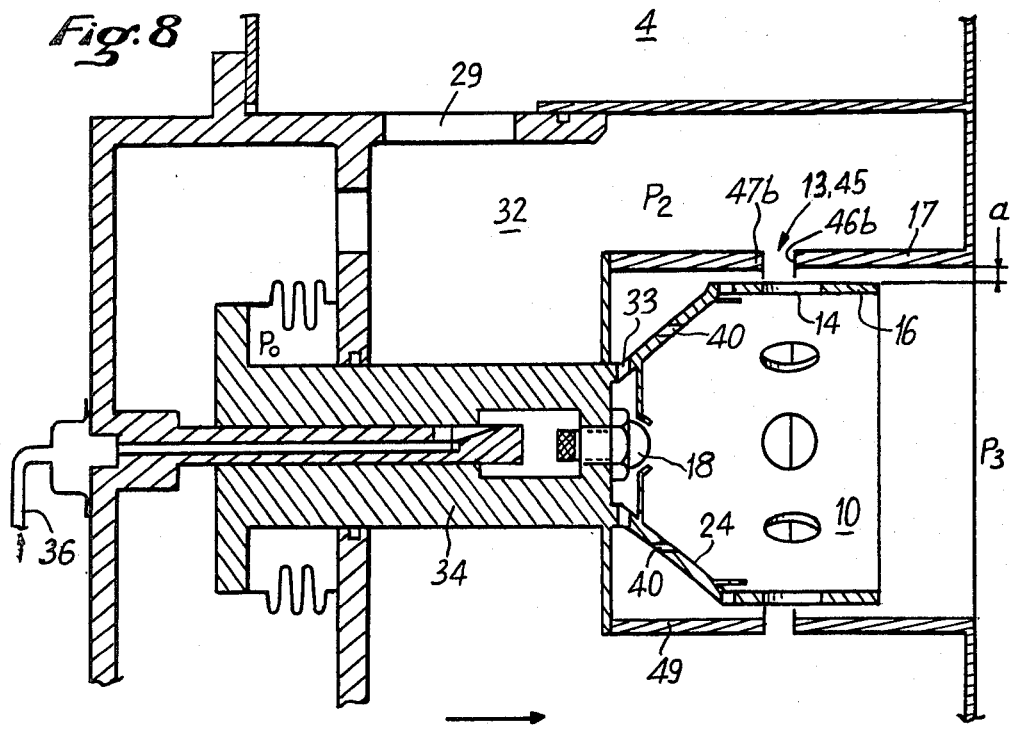
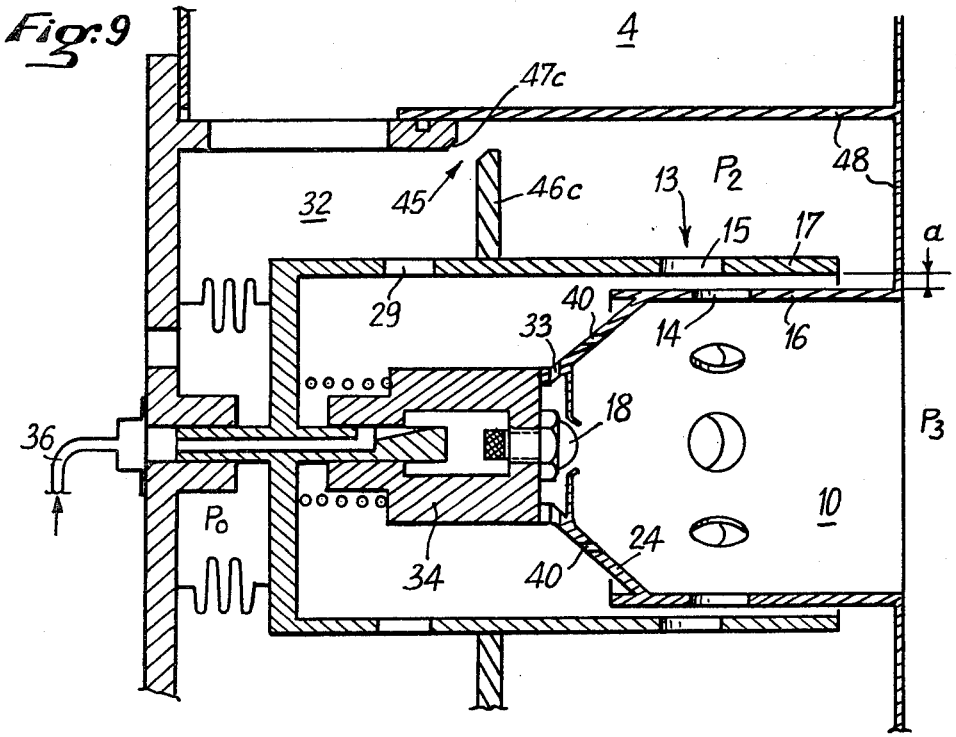

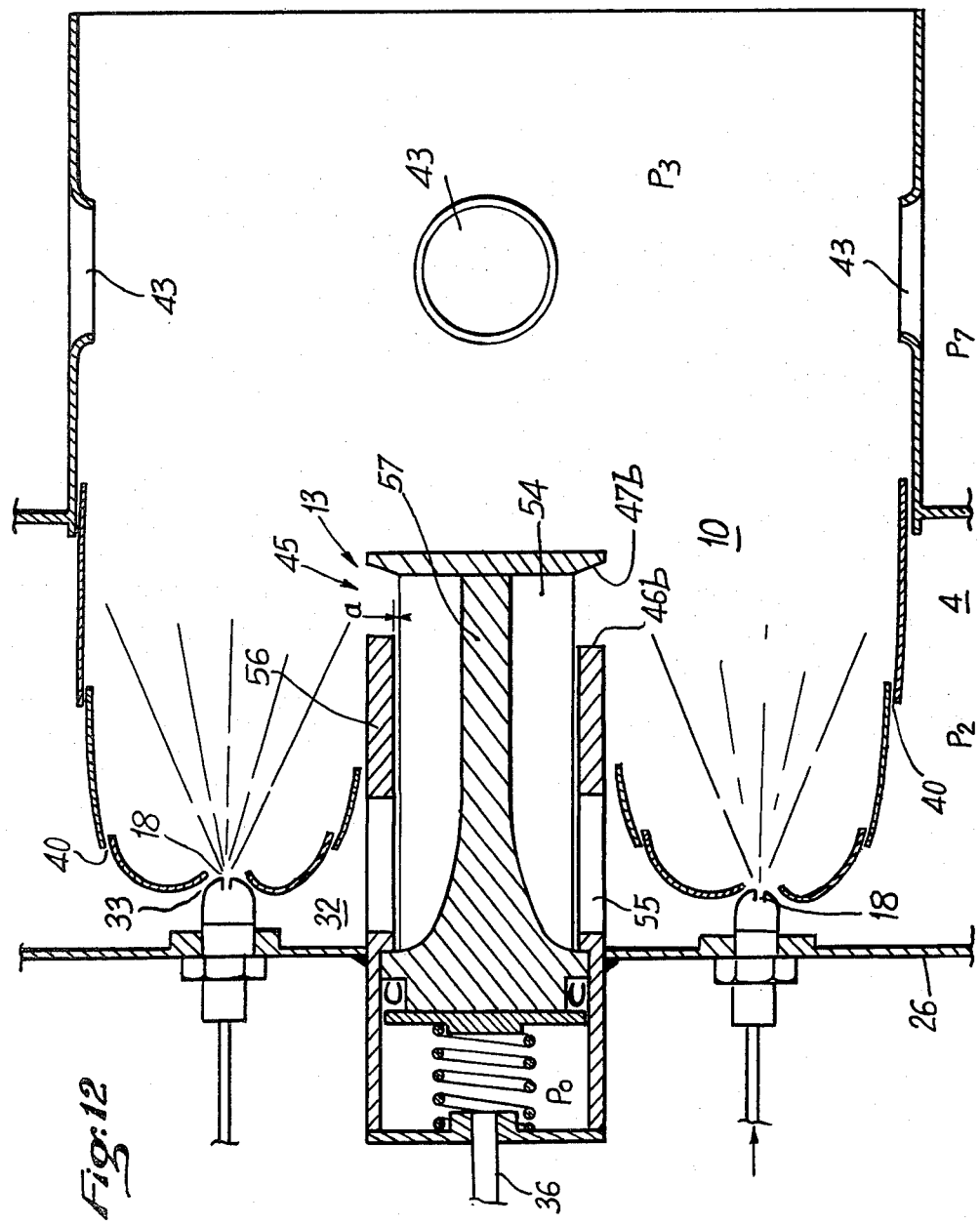

SUPERCHARGED INTERNAL COMBUSTION ENGINES, INTER ALIA DIESEL ENGINES

This is a continuation of prior co-pending application Ser. No. 06/216,367, filed Dec. 15, 1980, now abandoned.

BACKGROUND OF THE INVENTION

The invention relates to supercharged internal combustion engines, more particularly supercharged Diesel engines, comprising a compressor supplying fresh air in parallel to the engine and to a bypass having an auxiliary combustion chamber and a turbine which receives the engine exhaust gases and the gases from the auxiliary combustion chamber and mechanically drives the compressor, the bypass being divided into two main branches, the first of which ends in a dilution region or "secondary region" downstream of the upstream part or "primary region" of the auxiliary combustion chamber and has throttle means having a variable flow cross-section, whereas the second branch starts from a place on the first branch upstream of the first throttle means and opens into the primary region via second throttle means for throttling the flow cross-section, the second throttle means comprising coupled passages having a variable common free cross-section and formed respectively in an internal and external cylindrical means which are movable relative to one another, one of the cylindrical means at least partly bounding the primary region whereas the other at least partly bounds a cavity directly connected to the compressor outlet, at least one fuel injector opening into the primary region in the immediate neighbourhood of the aforementioned coupled passages, means being provided for correspondingly varying the flow rate of the fuel injector or injectors and also varying the flow rate of air entering the primary region via the common free section of the coupled passages, by moving the inner cylindrical means relative to the outer means.

Engines of the aforementioned kind have been described in U.S. Pat. No. 4,026,115. The coupled passages or orifices acting as the second throttle means by aerodynamic valve regulation (or blockage of air streams by partial alignment of pairs of coupled passages or orifices) have a position relative to the injector or injectors introducing fuel into the primary region of the auxiliary combustion chamber and relative to the first throttle means such that they produce a pressure drop which directly acts on the coupled passages or orifices. The result, in the primary region, is strong turbulence which provides optimum conditions for combustion irrespective of the extent to which the coupled passages or orifices are opened, i.e. under all operating conditions of the auxiliary combustion chamber. This saves fuel and prevents problems being caused by deposits of soot or coke on the walls of the auxiliary combustion chamber. The pressure drop can also be used for permanently and efficiently producing adequate air streams ("film cooling") via at least some of the constant-section air passages forming part of the second throttle means, so as inter alia to cool the walls of the primary region of the auxiliary combustion chamber under all conditions.

Note that the inner and outer cylindrical means, which are generally sleeves, can move relative to one another in translation or rotation or both, at least one of the inner and outer cylindrical means being movable. Usually the outer cylindrical means is stationary whereas the inner cylindrical means is movable, preferably in translation.

Since the outer cylindrical means is scavenged by the air supplied by the compressor, the air tends to maintain the outer cylindrical means at a relatively low, constant temperature. On the other hand the inner cylindrical means, which at least partly bounds the primary region of the auxiliary combustion chamber, is brought to a relatively high temperature which varies with the flow rate of fuel introduced through the injector or injectors and burnt in the primary region. The variations in temperature can reach e.g. 600° C. during operation. The inner and outer cylindrical means or sleeves are made of a material (refractory stainless steel) which expands considerably with temperature (of the order of 2 mm per meter and per 100° C. temperature rise).

The radial clearance between the two cylindrical means when cold has to be greatly increased to prevent them jamming together with hot (i.e. when the inner cylindrical means is hotter, corresponding to the maximum flow rate of air and fuel in the primary region). However, during pilot operation of the auxiliary combustion chamber (minimum flow rate of fuel and air in the primary region and combustion restricted to the bottom of the chamber), the inner cylindrical means radially contracts during cooling and leaves an annular space between its outer wall and the inner wall of the outer cylindrical means. The cross-section of the space is very large (of the order of 700 mm$^2$ when the diameter of the cylindrical means or sleeves is about 200 mm, under the aforementioned conditions with regard to temperature variations and the expansion coefficient). The annular space allows air to leak. The leakage is in proportion to the supercharging pressure, since the density of air is related to pressure and the pressure difference between the two sides of the leak cross-section increases with the supercharging pressure. Now it is precisely under such high-pressure conditions that the engine is most heavily loaded and must therefore be most effectively scavenged. No success has hitherto been obtained in attempts to reduce the aforementioned leak, inter alia by placing labyrinths at the periphery of the inner cylindrical member.

We are therefore faced with the following alternatives: if the radial clearance is small, the movable cylindrical means will jam against the stationary cylindrical means at the full flow rate, so that the chamber will unnecessarily be held in the full flow-rate position (resulting in overheating and fuel waste), or if the radial clearance is large, the auxiliary combustion chamber leaks during pilot operation. In that case, the first throttle means will be incapable of controlling the pressure drop between the compressor and turbine; this will interfere with proper scavenging of the engine at high power, as already explained, unless the compressor flow rate is increased, which will have the disadvantage of adversely affecting specific consumption under partial load.

SUMMARY OF THE INVENTION

The object of the present invention is to obviate the disadvantages due to differential expansion of the inner and outer cylindrical means in the previously-defined internal combustion engines, while retaining the specific advantages of such engines.

To this end, an internal combustion engine according to the invention is characterised in that: the second throttle means also have constant-section passages in parallel with the aforementioned coupled passages; the internal and external cylindrical means have radial dimensions such that, allowing for the thermal expansion coefficients of the material of which they are formed and their upper and lower operating temperatures, the radial clearance between them is always sufficient to prevent any lateral contact between the cylindrical means irrespective of the operating conditions of the auxiliary combustion chamber; and third throttle means having a variable flow section are mounted upstream of or at the coupled passages of the second throttle means, depending on the direction in which the air flows in the second branch of the bypass, and are actuated so that (a) their minimum flow section is zero and (b) irrespective of the amount to which the second and third throttle means are instantaneously opened, the flow section of the third throttle means is always either zero or much greater than the free section of the coupled passages of the second throttle means.

It is important that the third throttle means do not come into operation until after the second throttle means, since otherwise the pressure drop to be produced in the second branch of the bypass will occur at the third throttle means instead of at the coupled passages or orifices. This will prevent the radial air streams from entering the primary region and will consequently prevent turbulence assisting combustion in the aforementioned region; it will also "dislodge" the flame from the end of the primary region. Note that a permanent radial clearance between the two cylindrical means does not prevent air flowing through their coupled passages when they are at least partially aligned; its only effect is to deflect some of the air towards the secondary region via the annular space between the two cylindrical means.

Although the first throttle means can be manually actuated, it is advantageous to design them so that they are capable of producing a pressure drop which is substantially independent of the ratio of the air flow rate in the bypass to the total flow rate of air delivered by the compressor but varies in the same direction as the pressure upstream of the first throttle means. This results in automatic operation adapted to all engine operating conditions.

Whether the first throttle means are automatic or not, the ratio of the flow section of the first throttle means (if not zero) to the free section of the coupled passages of the second throttle means should preferably remain above 5 in all their respective instantaneous positions. This ensures that the pressure drop in the second branch of the bypass always occurs at the second throttle means and not at the third throttle means.

In an advantageous embodiment, the third throttle means comprise an annular closure element mounted on one of the cylindrical means combined with a seat secured to the other cylindrical means and co-operating with the annular element, the diameter of the seat being much greater than the respective diameters of the cylindrical means. Alternatively, the third throttle means can comprise an annular closure element identical with the free end of the outer cylindrical means combined with a seat secured to the inner cylindrical means and co-operating with the free end, the seat being disposed in the immediate neighbourhood of the coupled passages.

The aforementioned embodiment and variant have a particularly simple construction and enable the seat to co-operate with the annular closure means irrespective of the temperature and expansion of the two cylindrical means.

The constant-section passages forming part of the second throttle means can communicate, either directly or via third throttle means, with the cavity connected to the compressor outlet.

BRIEF DESCRIPTION OF THE DRAWINGS

The invention will be more clearly understood from the following description and accompanying drawings, the description and drawings relating to the prior art and to various embodiments of the invention.

In the drawings:

FIG. 2 is a view in section on a larger scale of the auxiliary combustion chamber of the engine in FIG. 1;

FIG. 4 is a diagrammatic axial section at the auxiliary combustion chamber through an internal combustion engine according to a first embodiment of the invention, the rest of the engine being similar to FIG. 1;

DESCRIPTION OF PRIOR ART

Before describing the invention, we must recall the prior art as disclosed in the aforementioned U.S. Pat. No. 4,026,115. The accompanying FIG. 1 corresponds to FIG. 7 of the aforementioned specification but has been added to as appropriate.

Figure 1:
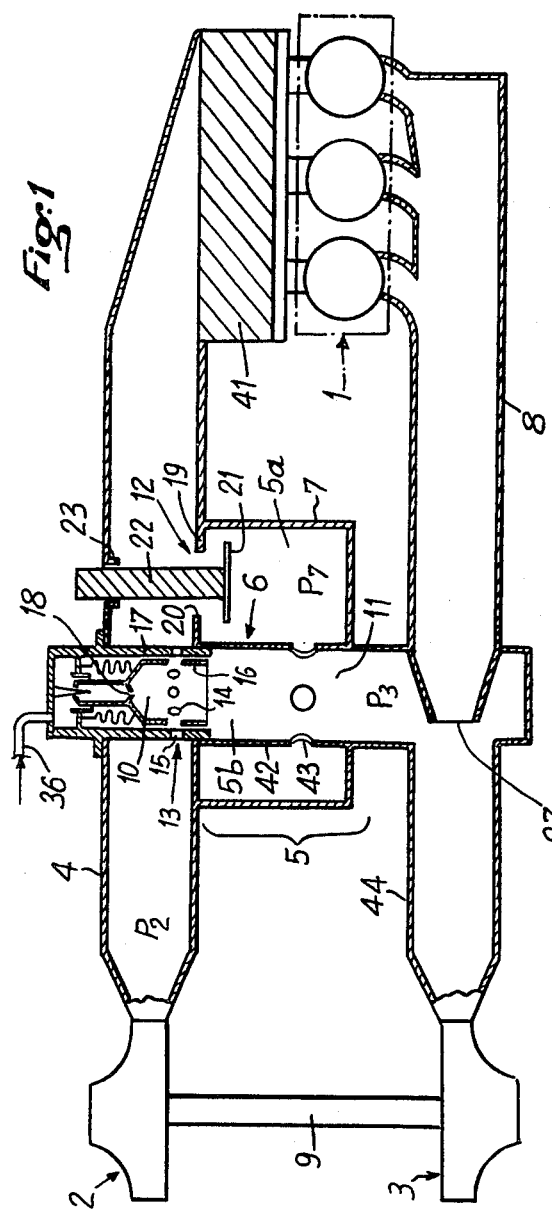
FIG. 1 is a diagrammatic section through a known internal combustion engine.

FIG. 1 shows a known internal combustion engine 1 comprising a compressor 2 supplying fresh air to engine 1 via a delivery pipe 4 equipped with a supercharging air cooler 41 and in parallel via a bypass 5 equipped with an auxiliary combustion chamber 6. Engine 1 also has a turbine 3 which receives the exhaust gases from engine 1 (via an exhaust pipe 8) and the gases from the auxiliary combustion chamber 6 and mechanically drives compressor 2, generally via a shaft 9. The auxiliary combustion chamber 6 is divided, in the downstream direction, into a primary region 10 and a secondary or dilution region 11.

The bypass 5 is divided into two principal branches 5a and 5b. Branch 5a terminates in the secondary region 11 and has first variable flow-section throttle means 12. Preferably, means 12 are capable of maintaining a pressure drop which is practically independent of the ratio of the air flow rate into bypass 5 to the total flow rate of air delivered by compressor 2 but varies in the same direction as the pressure upstream of means 12. The second branch 5b starts from a place on the first branch 5a upstream of the first throttle means 12 and opens into the primary region 10 via second means 13 for throttling the flow cross-section.

As shown in FIG. 2, the second throttle means 13 have a passage defined by an orifice 14 in a cylindrical inner sleeve 16 at least partly bounding the primary region 10, coupled with another passage defined by an orifice 15 formed in an outer cylindrical sleeve 17 which at least partly bounds a cavity 32 directly connected to the outlet of compressor 2. In the embodiment in FIGS. 1 and 2, cavity 32 comprises that part of delivery pipe 4 which surrounds the outer cylindrical sleeve 17. A fuel injector 18 (in FIG. 2) or a number of fuel injectors (in FIG. 12 described hereinafter) opens or open into the primary region 10 in the immediate neighbourhood of orifices 14 and 15.

Means are provided for correspondingly varying the flow rate of the fuel injector or injectors 18 and the flow rate of air entering the primary region 10 via the common free section of orifices 14 and 15, by moving sleeves 16 and 17 relative to one another.

In the embodiment in FIG. 1, the bypass 5 is bounded by a tank 7 which is separated from the delivery pipe 4 by a partition 19 downstream of which the branch 5a is formed. Partition 19 is formed with a hole having edges forming a seat 20 co-operating with a closure disc 21 downstream of the seat. Disc 21 is secured to a balancing piston 22 which extends through seat 20 and, via sealing means 23, the wall of the delivery pipe 4. Disc 21 and piston 22, which constitute the first throttle means 12, are in equilibrium under the action of a reference pressure $P_o$ on the cross-section of piston 22 at its top or outer part, and the pressure upstream ($P_2$) and downstream ($P_7$) of disc 21, the last-mentioned two pressures being exerted on the top and bottom surface of disc 21 respectively. If required, a return spring (not shown) can act on piston 22. If s is the cross-section of piston 22 and S is the surface of disc 21, the value of the rated relative pressure drop is given by the following formula, which expresses the equilibrium conditions of disc 21 (in the absence of the aforementioned return spring):

$$\frac{P_2 - P_7}{P_2 - P_0} = \frac{s}{S}$$

As can be seen, the first throttle means 12, comprising disc 21, are capable of maintaining a pressure drop $P_2-P_7$ which is practically independent of the ratio of the air flow rate in bypass 5 to the air flow delivered by compressor 2 but varies in the same direction as the pressure $P_2$ upstream of means 12. Means 12 may incidentally be replaced by equivalent means, some examples of which have been described in the aforementioned U.S. Pat. No. 4,026,115.

In the embodiment of FIGS. 1 and 2, the means for correspondingly varying the flow rate of the injector or injectors 18 and the flow rate of air entering the primary region 10 are constructed as follows. The outer sleeve 17 is stationary relative to the delivery pipe 4 whereas the inner sleeve 16, which is blocked at one side by an end 24, can move in translation. The space 28 between end 24 and a stationary wall 26 is connected by relatively large orifices 29 to the delivery pipe 4.

A cylinder 34 secured to end 24 extends through wall 26 via sealing means 35 enabling cylinder 34 to slide. A fuel delivery pipe system 36 ends in a chamber 37 borne by wall 26; chamber 37 communicates with cylinder 34 via an orifice 38 extending through one of the cylinder walls. The opposite wall of cylinder 34 forms part of end 24 and bears injector 18. A stationary needle valve 39 co-operates with orifice 38 so as to increase its cross-section in proportion as end 24 moves away from the stationary wall 26.

The pressure of fuel on cylinder 34 tends to push the inner sleeve 16 to the right in FIG. 2, i.e. to open wide the common free section of orifices 14, 15 simultaneously and orifice 38, thus producing the full flow rate of air and fuel in the auxiliary combustion chamber 6. If the energy in front of turbine 3 increases, the pressure $P_3$ on the right surface (in FIG. 2) of end 24 increases and drives the inner sleeve 16 back until the hydraulic force (i.e. fuel pressure) exerted on sleeve 16 balances the pneumatic force exerted thereon. Regulation is therefore automatic.

In short, the aforementioned methods efficiently produce corresponding variations in the flow rate of fuel in injector 18 and the flow rate of air entering the primary region 10 via the common free section of the coupled orifices 14 and 15. The aforementioned means may also be replaced by equivalent means, some examples of which have been described in the aforementioned U.S. Pat. No. 4,026,115.

Finally, end 24 is formed with calibrated orifices 40 and 33 which respectively cool the walls of the primary region 10 of the auxiliary combustion chamber 6 under all conditions and supply combustive air during pilot operation. Orifices 40 and 33, which have not been mentioned in U.S. Pat. No. 4,026,115, constitute the aforementioned constant-section passages and are in parallel with the coupled orifices 14 and 15 forming part of the second throttle means 13.

Sleeve 17 is matched to the delivery pipe 4 so that orifices 15 and 29 open in pipe 4. Sleeve 17 is prolonged by a pipe 42 which bounds the secondary region 11 and extends through tank 7. The engine exhaust pipe 8 opens into pipe 42 via a convergent means or mixer 27. Orifices 43 formed in pipe 42 inside tank 7 interconnect the downstream parts of branches 5a and 5b. An end pipe 44 connects mixer 27 to turbine 3 so that the latter can receive the engine exhaust gases and the combustion gases from chamber 6.

The resulting internal combustion engine operates in the following general manner:

The air delivered by compressor 2 divides into two streams, i.e. the air travelling through engine 1 and the remaining flow, which rejoins turbine 3 via the bypass 5. The remaining flow is also divided into two, i.e. a first part which supplies the primary region 10 via the coupled orifices 14 and 15 preferably in stoichiometric proportion with the fuel introduced through the injector or injectors 18, and a second part which enters the secondary region 11 via transverse air streams admitted through orifices 43, the second part of the remaining flow having previously travelled through the first throttle means 12 and diluted the very hot combustion gases coming from the primary region 10.

When engine 1 accelerates, there is an increase in the flow rate of air through it and a decrease in the remaining or complementary flow rate in the bypass 5. As a result, the first throttle means 12 gradually close and progressively reduce the flow rate of air admitted into the secondary region 11. The air admitted into the primary region 10 is at a flow rate which depends only on pressure and consequently on the load on engine 1 (not on its speed) and therefore continues to support combustion in region 10 under substantially stoichiometric conditions. The dilution (i.e. cooling) of the very hot gases from region 10 is at least partly maintained by the secondary air (orifices 43) and increasingly by the exhaust gases from engine 1 at mixer 27. The distance between orifices 43 and mixer 27 must therefore be as short as possible, to avoid overheating the part of the connecting pipe 42 downstream of orifices 43.

Since the air travelling through the primary region 10 is taken from upstream of the first throttle means 12, the pressure drop occurring during transit through orifices 14 and 15 is always maintained irrespective of the engine speed, owing to the presence of the first throttle means 12. Consequently, the air streams entering the primary region 10 through the common free section of orifices 14 and 15 always, irrespective of the operating conditions of chamber 6, have sufficient speed and penetration to maintain the amount of turbulence required for burning the fuel introduced through injector or injectors 18.

Figure 3:
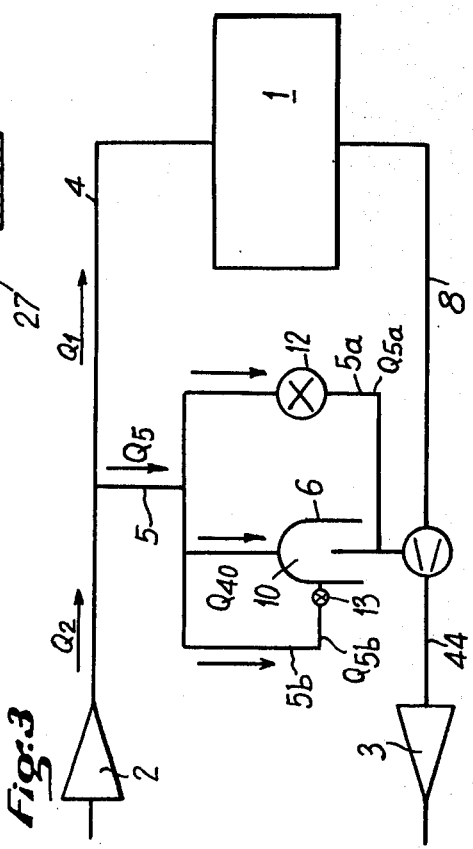
FIG. 3 diagrammatically shows the distribution of the air flows in the engine in FIG. 1.

FIG. 3 is a diagram showing how the air supplied by compressor 2 is distributed. Let $Q_2$ be the flow rate (in weight per time unit) of air delivered by compressor 2. Engine 1 absorbs a part $Q_1$ whereas the rest $Q_5 = Q_2 - Q_1$ travels along bypass 5. Next, the flow rate $Q_5$ is distributed into a rate $Q_{5a}$ admitted into the secondary region 11 of combustion chamber 6 via throttle means 12 (i.e. dilution air), a flow rate $Q_{5b}$ admitted into the primary region 10 via the throttle means 13 and a flow rate $Q_{40}$ admitted via orifices 40, 33 at the end of chamber 6. $Q_1$ depends on the operating conditions of engine 1 and the supercharging pressure produced by compressor 2.

The relative pressure drop between compressor 2 and turbine 3 varies in accordance with the previously-given formula. If there are any discrepancies in operation they may be caused by the following:

1. The real relative pressure drop is below the rated relative pressure drop:
   (a) The first throttle means 12 are closed normally; the flow rate $Q_2$ of compressor 2 is insufficient (engine 1 takes in too much air); the uncontrolled fraction of flow $Q_5$ is too large;
   (b) The first throttle means 12 are jammed in the open position.
2. The real relative pressure drop is greater than the rated relative pressure drop:
   The first throttle means 12 are wide open and the interfering pressure drops in bypass 5 are excessive.

In short, a leak via branch 5a of chamber 6 during pilot operation, at a given compressor flow rate $Q_2$ and an engine flow rate $Q_1$, reduces the flow rate through the first throttle means 12.

Consequently, as briefly set out in the introductory part of this description, (1) Either the flow rate of compressor 2 is increased (but this adversely affects the specific consumption under partial load) or (2) The flow rate through the first throttle means 12 is insufficient.

This occurs at the maximum power, where the ratio of the flow rate $Q_1$ at engine 1 to the flow rate $Q_2$ supplied by compressor 2 is highest. In that case, the real relative pressure drop is less than the rated relative pressure drop; the latter is not maintained, which is particularly disadvantageous for an engine 1 which needs to be scavenged, and in the case of a four-stroke engine, has a particularly disadvantageous effect on specific consumption (since the pressure $P_3$ upstream of turbine 3 increases, with a consequent increase in the delivery work of engine 1).

DESCRIPTION OF PREFERRED EMBODIMENT OF THE INVENTION

To eliminate these difficulties, the internal combustion engine 1 according to the invention is mainly characterised in that the cylindrical means (or sleeves in most embodiments), i.e. the inner means 16 and the outer means 17, have radial dimensions such that, allowing for the thermal expansion coefficients of the material of which they are formed and the upper and lower limits of their operating temperatures, the radial clearance a (FIGS. 4 and 6 to 12) between them is always sufficient to prevent any contact between the outer side wall of the inner cylindrical means 16 and the inner side wall of the outer cylindrical means 17, irrespective of the operating conditions of the auxiliary fuel chamber 6. In addition, third throttle means 45 having a variable cross-section are mounted upstream or at the coupled passages 14, 15 of the second throttle means 13, depending on the flow direction of air in the second branch 5b of bypass 5, and are actuated so that:

(a) Their minimum flow cross-section is zero and
(b) Irrespective of the extent to which the second and third throttle means 13 and 45 are instantaneously opened, the flow section of the third throttle means 45 is either zero of much greater than (preferably at least 5 times as great as) the free section of the coupled orifices 14, 15 of the second throttle means 13.

In a particularly simple construction, the third throttle means 45 comprise an annular closure element 46 (FIGS. 4 and 6) or 46c (FIGS. 9 and 10) secured to one of the cylindrical means 16 (FIGS. 4 and 6) or 17 (FIGS. 9 and 10) and combined with a seat 47 (FIGS. 4 and 6) or 47c (FIGS. 9 and 10) secured to the other end cylindrical means 17 (FIGS. 4 and 6) or 16 (FIGS. 9 and 10) and co-operating with the aforementioned annular element 46 (FIGS. 4 and 6) or 46c (FIGS. 9 and 10), the diameter of seat 47 or 47c being much greater than the respective diameters of the cylindrical means 16 and 17.

In a variant, the third throttle means 46 comprise an annular closure element 46b (FIGS. 7 and 8) or 46d (FIG. 11) identical with the free end of the outer cylindrical means 17, combined with a seat 47b (FIGS. 7 and 8) or 47d (FIG. 11) secured to the inner cylindrical member 16 and co-operating with the aforementioned free end, seat 47b or 47d being disposed in the immediate neighbourhood of the coupled passages. In the last-mentioned variant, the coupled passages 14, 15 are simply a ring of orifices having an individual contour which is closed on the inner sleeve 16 but not on the outer sleeve 17.

In the first case (FIGS. 4, 6, 9 and 10) the third throttle means 45 are distinct from the second throttle means 13, which latter are made up of two coupled rings of orifices 14, 15 formed in sleeves 16 and 17 respectively. In the embodiments in FIGS. 4 and 6, the outer sleeve 17 is stationary and the inner sleeve 16 is movable in translation, as in the known construction in FIGS. 1 and 2, i.e. by moving to the left in FIGS. 4 and 6 to reduce the common section of orifices 14 and 15. In the embodiments in FIGS. 9 and 10, on the other hand, the inner sleeve 16 is stationary and the outer sleeve 17 is movable in translation. In the various embodiments in FIGS. 4, 6, 9 and 10, seat 47 or 47c is secured to the stationary sleeve 17 or 16 by a rigid holder 48. The closure element 46 or 46b is a flat disc secured to the outer surface of the movable sleeve 16 or 17.

Figure 5:
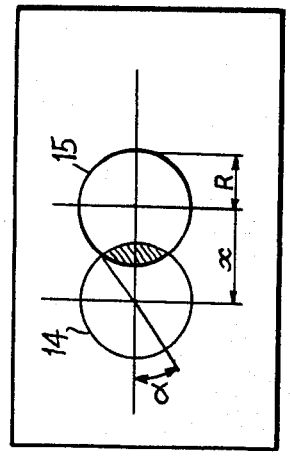
FIG. 5 is a larger-scale view of a pair of coupled orifices forming part of the second throttle means of the embodiment of FIG. 4, and FIGS. 6 to 12 each show a variant of the embodiment in FIG. 4.

The following numerical example is given in order to illustrate the successive manner in which the second throttle means 13 and the third throttle means 45 go into operation. We shall assume that sleeves 16, 17 in FIG. 4 each have 12 circular orifices 14, 15 of diameter $2R = 7$ mm. Let $x$ (in mm) be the travel of the moving sleeve 16 starting from the position where orifices 14 and 15 coincide. The area common to the two orifices is indicated by shading in FIG. 5. If α is the half-angle at the centre of the arc in which the aforementioned area is inscribed in each of the circles bounding the orifices, the common area or total uncovered area is equal to:

$$48 \cdot R \left( \frac{R\alpha}{180} - \frac{x}{4} \sin \alpha \right) \text{ mm}^2$$

in which $\alpha = \arccos x/2R$.

The area to the right of the third throttle means 45, i.e. between element 46 and seat 47, is equal to:

$(12-x)0.395$ mm$^2$ approximately, if seat 47 has a diameter of 126 mm.

The following successive values are thus obtained, in dependence on x:

| x (mm) | α (°) | Total common area of orifices 14 and 15 (mm$^2$) | Area of the passage in seat 47 (mm$^2$) |
|---|---|---|---|
| 0 | 90 | 462 | 4750 |
| 1 | 81.8 | 399 | 4354 |
| 2 | 73.4 | 336 | 3958 |
| 3 | 64.6 | 275 | 3563 |
| 4 | 55.2 | 214 | 3167 |
| 5 | 44.4 | 154 | 2771 |
| 6 | 31.0 | 94 | 2375 |
| 7 | 0 | 0 | 1979 |
| 8 | 0 | 0 | 1583 |
| 9 | 0 | 0 | 1187 |
| 10 | 0 | 0 | 792 |
| 11 | 0 | 0 | 396 |
| 12 | 0 | 0 | 0 |

It can be seen that, except at the end of travel of the moving sleeve 16, the common section of orifices 14, 15 is appreciably smaller than the flow section at seat 47, the ratio being less than 1/5. The pressure drop, which is inversely proportional to the square of the flow sections, thus occurs on the two side of orifices 14, 15 rather than on the two sides of seat 47. The air streams thus penetrate easily into the primary region 10. It is only at the end of travel of sleeve 16 that the closure element 46 bears on seat 47. This prevents any appreciable air leakage via the annular clearance a. This ensures that flow rate $Q_1$ absorbed by engine 1 is sufficient without compressor 2 having to be increased in size. Even without increasing the size, the air flow through orifices 33 is sufficient to supply injector 18 during pilot operation and the air flow through orifices 40 is sufficient to cool the wall of the auxiliary combustion chamber 6.

Figure 6:
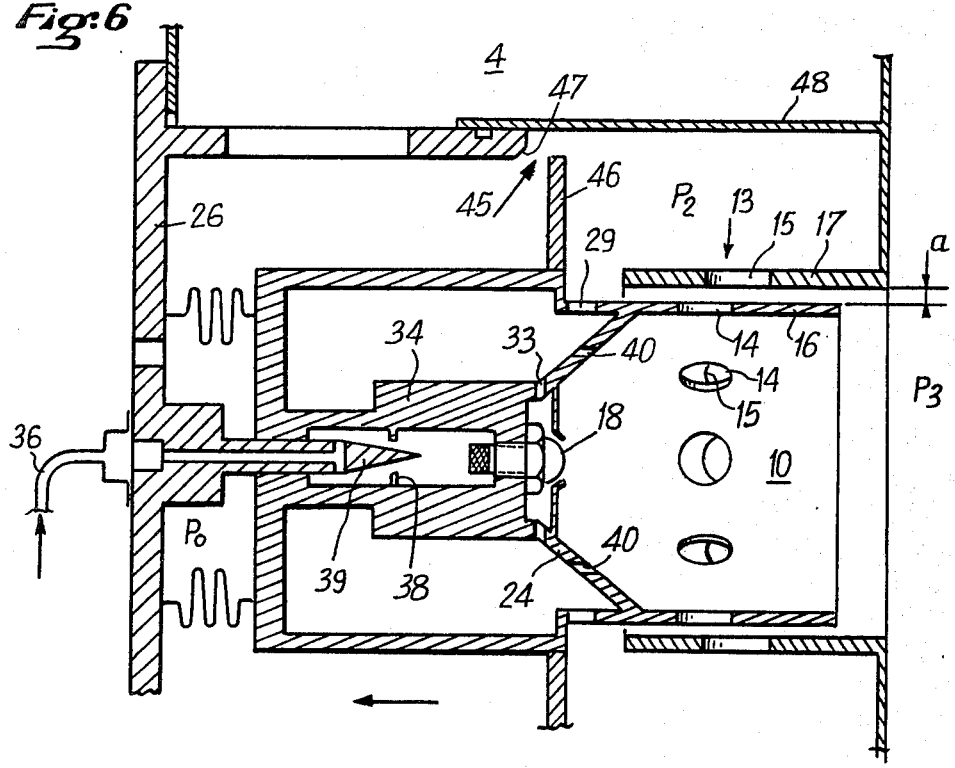

FIG. 6 shows an embodiment differing from FIG. 4 only in that orifices 33 and 40 are no longer upstream (FIG. 4) but downstream (FIG. 6) of the third throttle means 45, thus further increasing the ratio $Q_1/Q_2$.

Figure 7:
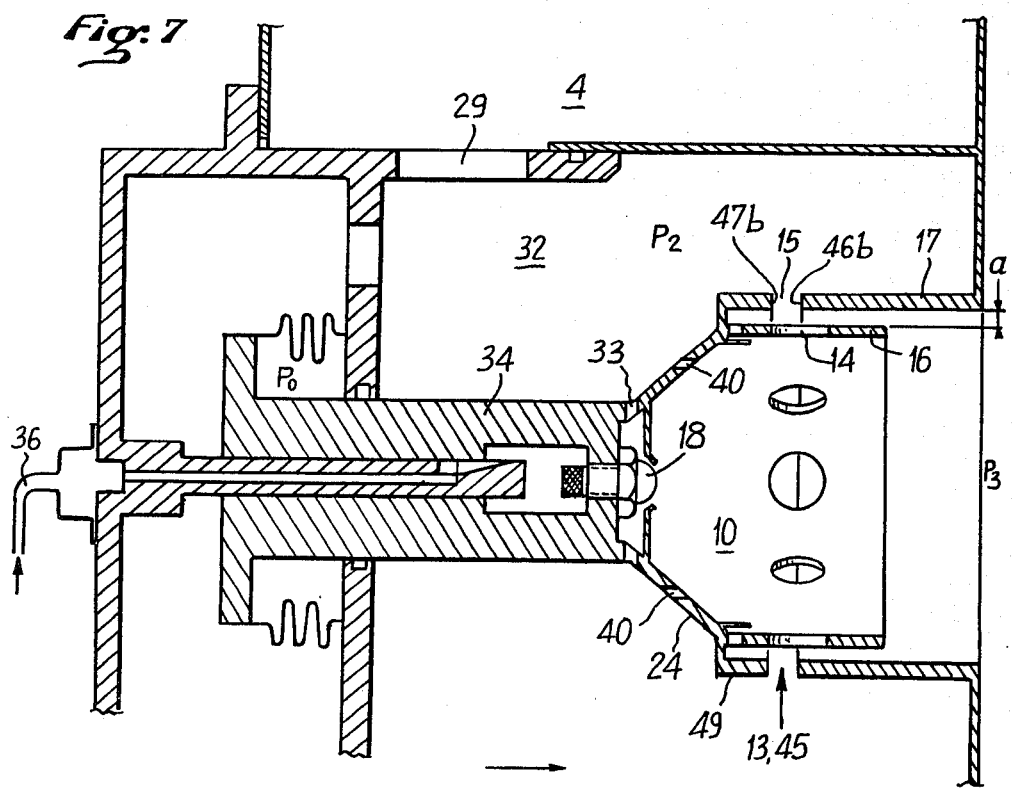

FIG. 7 shows an embodiment which differs from FIG. 4, firstly in that the inner sleeve 16 moves in translation in the opposite direction (i.e. to the right in FIG. 7) to reduce the common section of the coupled passages 14 and 15 and secondary in that the third throttle means 45 are identical with the second throttle means 13. As in the preceding case, the inner sleeve 16 is formed with a ring of separate circular orifices 14 but the orifices 15, coupled with orifices 14, are combined into a single angular space between the free edge of an auxiliary sleeve 49, borne coaxially by the movable inner sleeve 16 outside it and forming the aforementioned seat 47b, and the annular closure element 46b constituting the rear free end of the stationary outer sleeve 17. This, of course, requires an appropriate modification in the means regulating the flow rate of fuel introduced into injector 18.

FIG. 8 shows an embodiment differeing from FIG. 7 only in that orifices 33 and 40 are disposed not upstream (FIG. 7) but downstream (FIG. 8) of the third throttle means 45. To this end it is only necessary to move back the place where auxiliary sleeve 49 is attached to end 24 or cylinder 34.

FIG. 9 shows an embodiment differing from FIG. 4 in that the outer sleeve 17, instead of being stationary (FIG. 4) can move in translation (FIG. 9) whereas the inner sleeve 16, instead of being movable (FIG. 4) is stationary (FIG. 9). Consequently the annular closure element 46 or 46c is secured not to the inner sleeve 16 (FIG. 4) but to the outer sleeve 17 (FIG. 9). In both cases, the movable sleeve 16 (FIG. 4) or 17 (FIG. 9) moves in the same direction.

Figure 10:
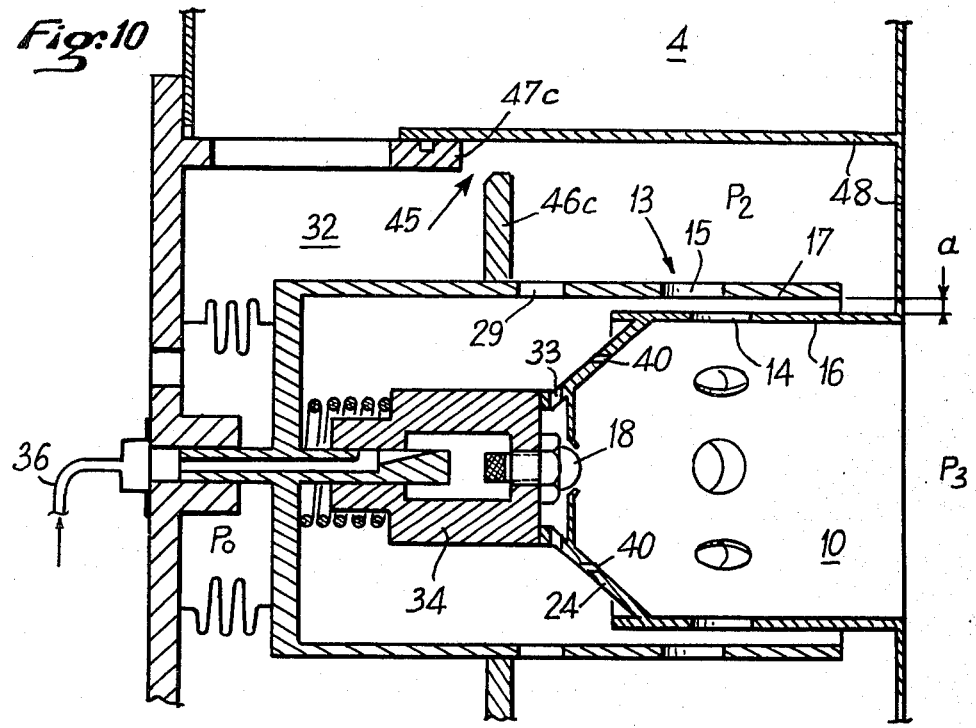

FIG. 10 shows an embodiment differing from FIG. 9 only in that orifices 33 and 40 are disposed not upstream (FIG. 9) but downstream (FIG. 10) of the third throttle means 45. To this end, orifices 29 in the outer sleeve 17 for supplying orifices 33 and 40 are placed either well upstream (FIG. 9) or well downstream (FIG. 10) of the annular closure element 46c.

Figure 11:
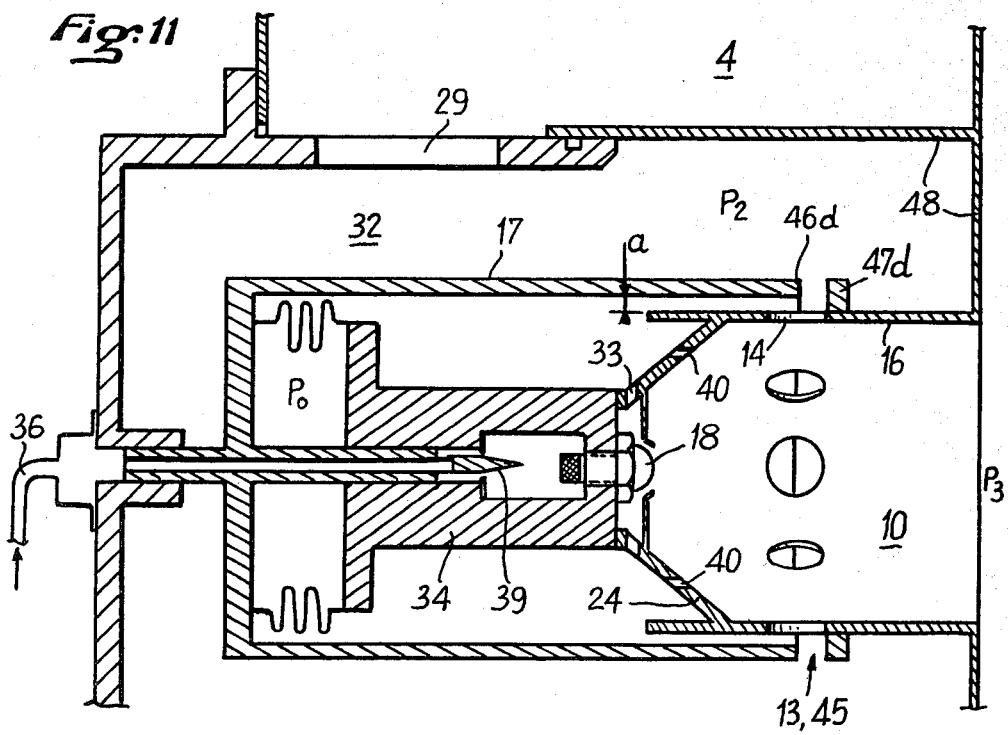

FIG. 11 shows an embodiment differing from FIG. 8 in that the outer sleeve 17 instead of being stationary (FIG. 8) is movable in translation (FIG. 11) whereas the inner sleeve 16 instead of being movable (FIG. 8) is stationary (FIG. 11).

The embodiments in FIGS. 6 to 11 operate in similar manner to FIG. 4; the second and third throttle means 13 and 45 vary in a slightly modified manner but have the same overall effect.

FIG. 12 shows an embodiment which differs from FIG. 4 in the following respects:

(a) As already stated, a number of injectors 18 are disposed in a ring instead of a single injector.

(b) The inner and outer cylindrical means having coupled orifices are not a pair of sleeves 16, 17 but a stationary outer sleeve 56 connected by air inlet holes 55 to the delivery pipe 4 and a cylindrical plunger 57 adapted to slide in sleeve 56.

(c) The coupled orifices in the present case are longitudinal grooves 54 disposed in cylindrical plunger 57 in axial planes and permanently communicating with holes 55; they also, in a manner similar to the construction in FIGS. 7 and 8, comprise an annular space between the free edge of the stationary sleeve 56, constituting the aforementioned closure element 46b, and an annular seat 47b borne by the free end of the cylindrical plunger 57.

In the definition of internal combustion engines to which the invention refers, it was stated, with reference to the inner and outer cylindrical means, that one at least partly bounds the primary region whereas the other at least partly bounds a cavity directly connected to the compressor outlet. The expression "directly connected" by implication means "at least in the absence of third throttle means 45 according to the invention" since as shown from FIGS. 4 and 6, the aforementioned throttle means can be inserted between the compressor outlet and the cavity which is at least partly bounded by the inner or the outer cylindrical means.

We claim:

1. A supercharged internal combustion engine comprising a compressor supplying fresh air in parallel to the engine and to a bypass having an auxiliary combustion chamber and a turbine which receives the engine exhaust gases and the gases from the auxiliary combustion chamber and mechanically drives the compressor, the bypass being divided into two main branches, the first of which ends in a dilution region or "secondary region" downstream of the upstream part or "primary region" of the auxiliary combustion chamber and has first throttle means having a variable flow cross-section, whereas the second branch starts from a place on the first branch upstream of the first throttle means and opens into the primary region via second means for throttling the flow cross-section, the second throttle means comprising coupled passages having a variable common free cross-section and formed respectively in an internal and an external cylindrical means which are movable relative to one another, one of them at least partly bounding the primary region whereas the other at least partly bounds a cavity directly connected to the compressor outlet, at least one fuel injector opening into the primary region in the immediate neighbourhood of the aforementioned coupled passages, means being provided for correspondingly varying the flow rate of the fuel injector or injectors and also varying the flow rate of air entering the primary region via the common free section of the coupled passages, by moving the inner cylindrical means relative to the outer means, the engine being characterized in that:

the second throttle means also have constant-section passages in parallel with the aforementioned coupled passages;

the internal and external cylindrical means having radial dimensions such that, allowing for the thermal expansion coefficients of the material of which they are formed and their upper and lower operating temperatures, the radial clearance between them is always sufficient to prevent any lateral contact between the cylindrical means irrespective of the operating conditions of the auxiliary combustion chamber; and third throttle means having a variable flow section are mounted upstream of or at the coupled passages of the second throttle means, depending on the direction in which the air flows in the second branch of the bypass, and are actuated so that:

(a) their minimum flow section is zero and (b) irrespective of the amounts to which the second and third throttle means are instantaneously opened, the flow section of the third throttle means is always either zero or much greater than the free section of the coupled passages of the second throttle means.

2. An engine as claimed in claim 1, wherein the first throttle means are designed to produce a pressure drop which is practically independent of the ratio of the air flow rate in the bypass to the total flow rate of air delivered by the compressor but varies in the same direction as the pressure upstream of the first throttle means.

3. An engine as claimed in claim 1 wherein the ratio of the flow section of the third throttle means (if not zero) to the free section of the coupled passages of the second throttle means remains above 5 in all their respective instantaneous positions.

4. An engine as claimed in claim 1 wherein the third throttle means comprise an annular closure element, mounted on one of the cylindrical means, combined with a seat secured to the other cylindrical means and co-operating with the annular element, the diameter of the seat being considerably greater than the respective diameters of the cylindrical means.

5. An engine as claimed in claim 1 wherein the third throttle means comprise an annular closure element, identical with the free end of the outer cylindrical means, combined with a seat secured to the inner cylindrical means and co-operating with the aforementioned free end, the seat being disposed in the immediate neighbourhood of the coupled passages.

6. An engine as claimed in claim 1 wherein the constant-section passages of the second throttle means communicate directly with the aforementioned cavity connected to the compressor outlet.

7. An engine as claimed in claim 1 wherein the constant-section passages of the second throttle means communicate via the third throttle means with the cavity connected to the compressor outlet.

8. An engine as claimed in claim 4 wherein the third throttle means comprise an annular closure element, mounted on one of the cylindrical means, combined with a seat secured to the other cylindrical means and co-operating with the annular element, the diameter of the seat being considerably greater than the respective diameters of the cylindrical means.

9. An engine as claimed in claim 3 wherein the third throttle means comprise an annular closure element, mounted on one of the cylindrical means, combined with a seat secured to the other cylindrical means and co-operating with the annular element, the diameter of the seat being considerably greater than the respective diameters of the cylindrical means.

10. An engine as claimed in claim 2 wherein the third throttle means comprise an annular closure element, identical with the free end of the outer cylindrical means, combined with a seat secured to the inner cylindrical means and co-operating with the aforementioned free end, the seat being disposed in the immediate neighbourhood of the coupled passages.

11. An engine as claimed in claim 3 wherein the third throttle means comprise an annular closure element, identical with the free end of the outer cylindrical means, combined with a seat secured to the inner cylindrical means and co-operating with the aforementioned free end, the seat being disposed in the immediate neighbourhood of the coupled passages.

12. An engine as claimed in claim 2 wherein the constant-section passages of the second throttle means communicate directly with the aforementioned cavity connected to the compressor outlet.

13. An engine as claimed in claim 3 wherein the constant-section passages of the second throttle means communicate directly with the aforementioned cavity connected to the compressor outlet.

14. An engine as claimed in claim 2 wherein the constant-section passages of the second throttle means communicate via the third throttle means with the cavity connected to the compressor outlet.

15. An engine as claimed in claim 3 wherein the constant-section passages of the second throttle means communicate via the third throttle means with the cavity connected to the compressor outlet.

* * * * *